United States Patent [19]

Sugiura et al.

[11] Patent Number: 4,751,376
[45] Date of Patent: Jun. 14, 1988

[54] IMAGE READER WITH FOCUS AND MAGNIFICATION DETECTION CONTROL

[75] Inventors: Masamichi Sugiura; Hirofumi Hasegawa; Akio Nakajima, all of Toyokawa, Japan

[73] Assignee: Minolta Camera Kabushiki Kaisha, Osaka, Japan

[21] Appl. No.: 850,934

[22] Filed: Apr. 11, 1986

[30] Foreign Application Priority Data

Apr. 12, 1985 [JP] Japan .................................. 60-78959
Jun. 27, 1985 [JP] Japan .................................. 60-141914
Dec. 14, 1985 [JP] Japan .................................. 60-281718

[51] Int. Cl.$^4$ ................................................. G01J 1/20
[52] U.S. Cl. ..................................... 250/201; 358/293
[58] Field of Search ............... 250/578, 234, 235, 236, 250/201 AF, 201 R; 358/293, 294

[56] References Cited

U.S. PATENT DOCUMENTS

| 4,283,137 | 8/1981 | Tsunekawa et al. | 250/201 |
| 4,464,681 | 8/1984 | Jacobs et al. | 358/293 |
| 4,472,055 | 9/1984 | Tsutsumi | 250/201 |

Primary Examiner—David C. Nelms
Assistant Examiner—Jessica L. Ruoff
Attorney, Agent, or Firm—Price, Gess & Ubell

[57] ABSTRACT

There is disclosed an image reader in which the reading magnification can be changed optically to a value designated. The image reader provides a device for adjusting the reading magnitude by moving a lens in the direction of the optical axis thereof and adjusting the focusing by shifting the image sensor relative to the lens. Further, the image reader provides a device for measuring the magnification and calculates amounts of movements for the lens and image sensor respectively based upon the measured magnification and the designated magnification. The lens and image sensor are moved respectively by the amount calculated to give the designated magnification in the focused state.

22 Claims, 9 Drawing Sheets

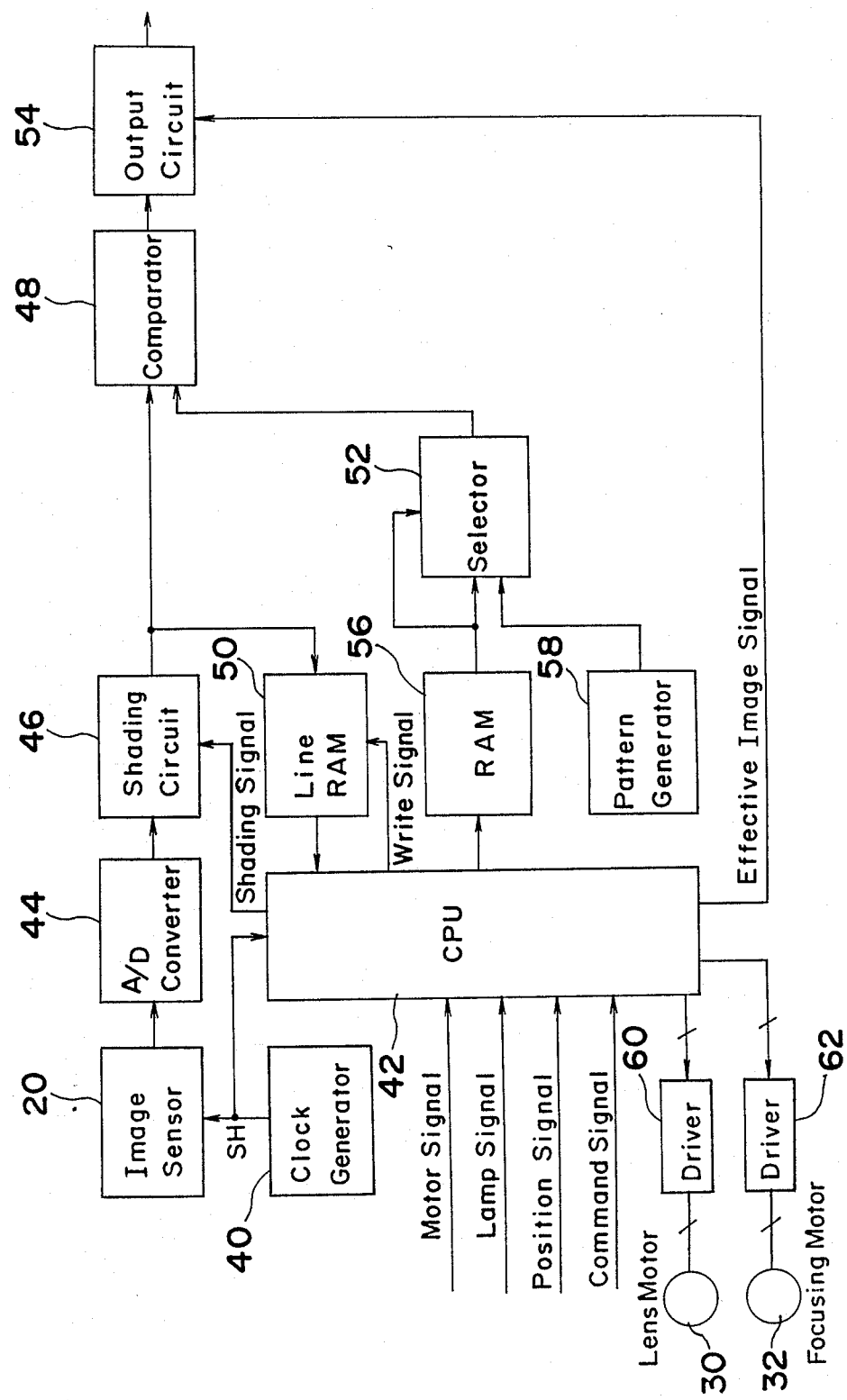

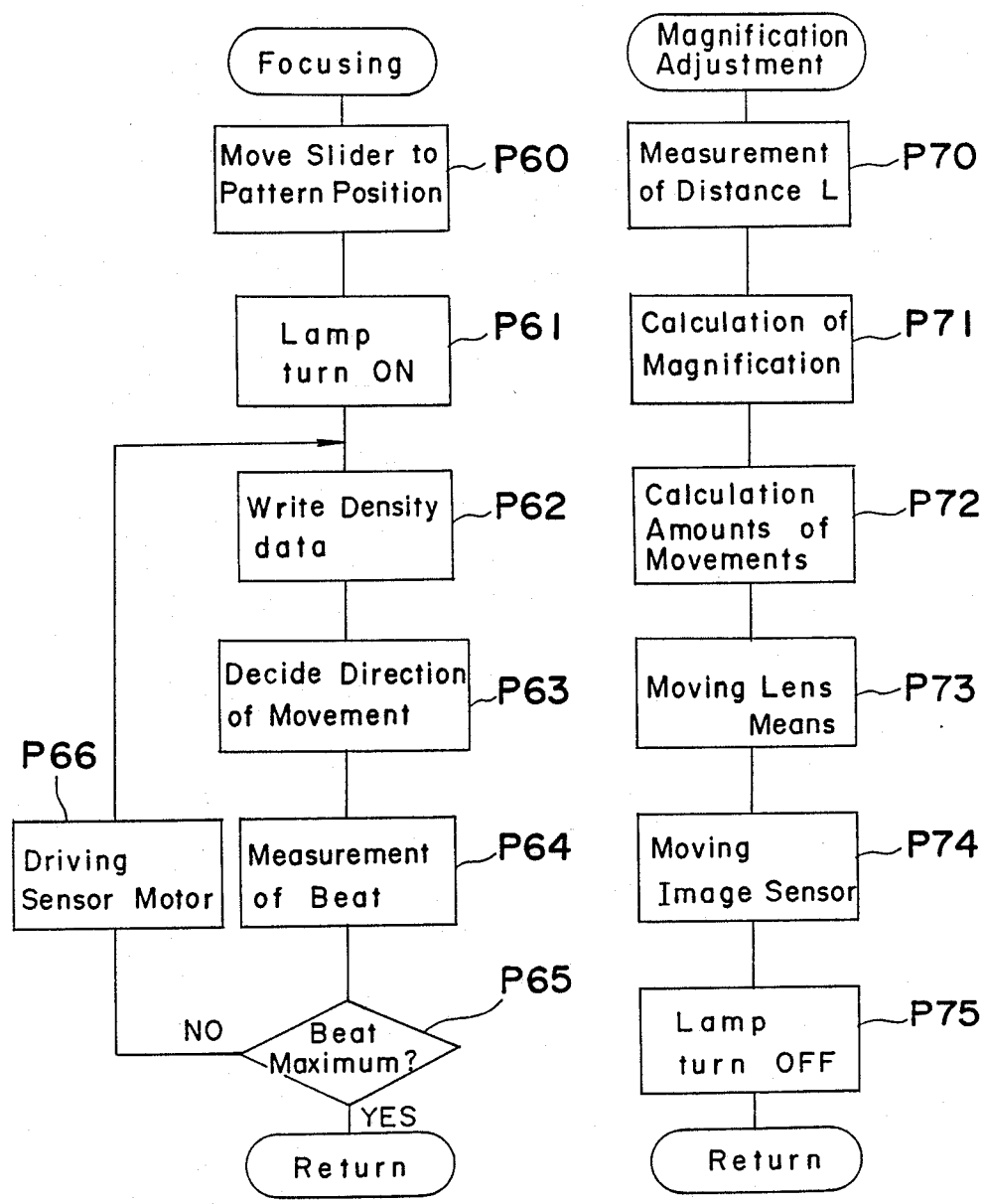

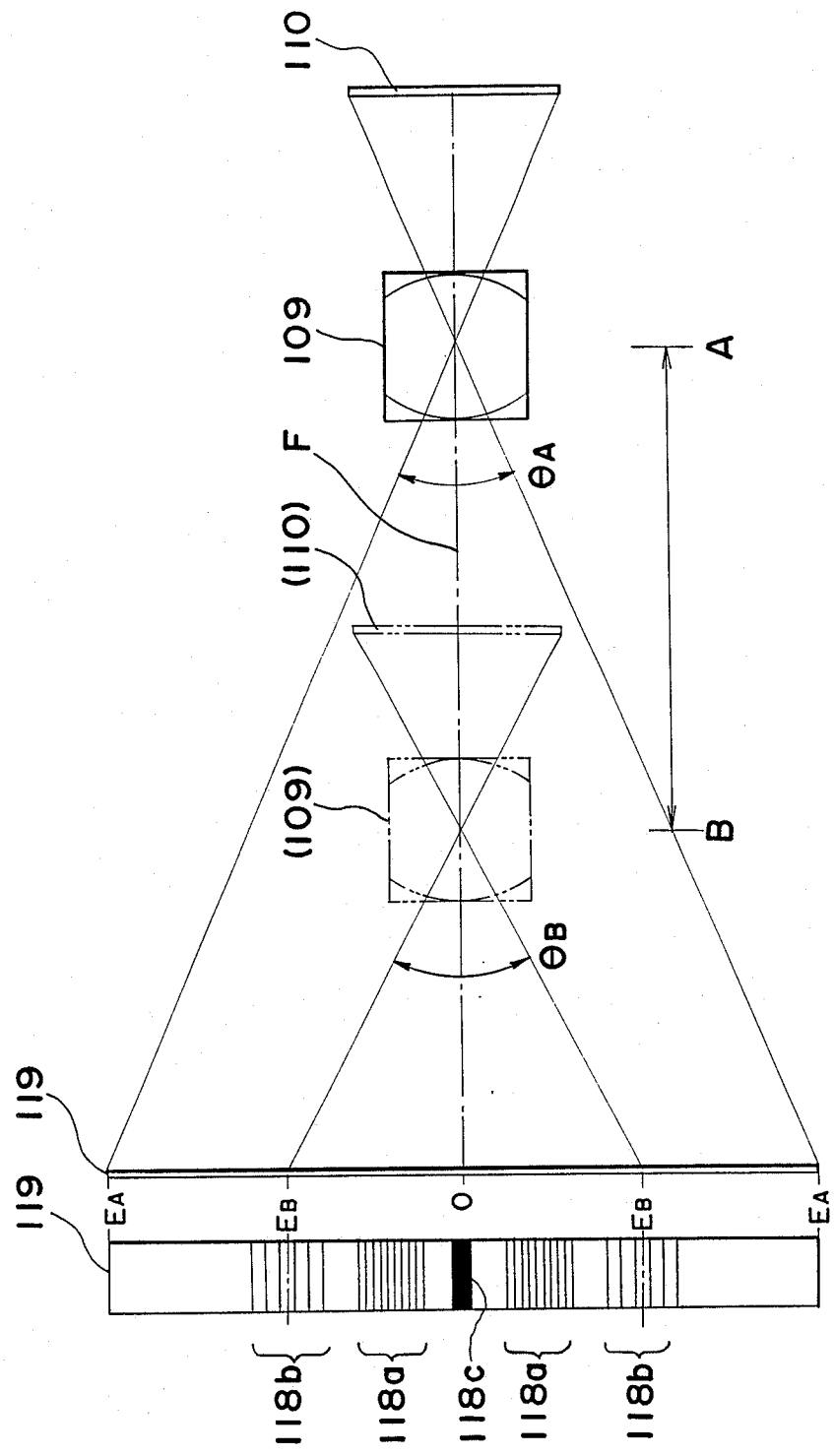

Amount of Defocus

Amount of Defocus

Distance Between Lens means and Image sensor

IMAGE READER WITH FOCUS AND MAGNIFICATION DETECTION CONTROL

BACKGROUND OF THE INVENTION

1. Field of the Invention

The present invention relates to an image reader comprising a solid-state image sensor for reading the density of an original and, especially, relates to the adjustment for the reading magnification and focusing of the image of the original.

2. Description of the Prior Art

In an image reader of this type, the density of an image is read by a solid-state image sensor usually consisting of a linear array of micro cells each of which is made as a charge coupled device (CCD) and is output as binary signals obtained by processing outputs of the solid-state image sensor.

In an image reader including a zooming mechanism for changing the magnification of an image optically, the adjustment for the magnification and focusing is done by displacing the focusing lens and/or the solid-state image sensor. It becomes necessarsy to set the focusing lens and the solid-state image sensor respectively at positions to be determined by the magnification designated when the power switch was turned on, or when a new magnification was designated by an operator.

In a conventional image reader, the focusing lens and image sensor are reset to such a respective normal position that an equal magnification is obtained thereat when the power switch was turned on.

When a new magnification was designated, the focusing and magnification are adjusted in turn. Namely, for instance, the focusing is adjusted at first and, then, the magnification is calculated in that state and, thereafter, the focusing lens is displaced so as to provide the magnification designated. However, since the focusing and magnification are correlated with each other, the magnification is slightly changed due to the adjustment of the focusing even when the focusing lens has been set to a position determined from the magnification designated prior thereto. Accordingly, it becomes necessary to repeat the adjustment of the focusing and magnification until the designated magnification is obtained in a fine focusing state.

Furthermore, the focusing lens used in the image reader is designed as a contractive optical lens system usually, since it is necessary to project the original image onto the image sensor having a smaller dimension than that of the image.

Due to this, the depth of field of the focusing lens becomes very shallow to an order of ±0.01 mm. Therefore, it is very difficult to set the focusing lens mechanically at an exact focusing position.

In order to control the position of the focusing lens exactly, there has been proposed a focusing system being characterized in that a sheet on which a pattern of black and white vertical stripes is printed is provided for adjustment for focusing, that, upon focusing, said stripe pattern is made projected onto the image sensor through the contraction lens system in order to cause an interference between the projected stripe pattern and the pitch of the cell of the image sensor and that the position of the focusing lens is controlled so that the contrast obtained from the outputs of the image sensor become a maximum (Japanese Laid-Open Publication No. 173705/1983).

However, this proposed focusing system has a disadvantage in that the modulation transfer function (hereinafter referred to as M.T.F) is lowered considerably at each edge portion of the angle of field, since the position for focusing control is set at the center of the angle of the field. Further, it has another disadvantage in that the focusing control becomes unstable in such a case that where no interference by the stripe pattern can be obtained when a considerably large or small magnification was designated.

SUMMARY OF THE INVENTION

One of the objects of the present invention is to provide an image reader capable of changing the magnification optically so that the adjustment with respect to both of the focusing and magnification can be carried out in a short time.

Another object of the present invention is to provide an image reader which is able to carry out the focusing adjustment while maintaining an optimum M.T.F over the whole area of the angle of field and to do it stably even when a considerable large or small magnification is designated.

To this end, there is provided, according to the present invention, an image reader having a focusing lens means for focusing an original image on an image sensor wherein said focusing lens means and image sensor are movable relative to each other in the direction of the optical axis of the focusing lens means in order to read said image with a magnification designated which is characterized by comprising means for designating a magnification desired, means for moving the focusing lens means against the original image, means for moving the image sensor against the focusing lens means, means for measuring a magnification corresponding to the position of the focusing lens means, a decision means for deciding whether the image is focused or not, and a control means for controlling said moving means for the focusing lens means and said moving means for the image sensor in order to move the focusing lens means and the image sensor to a respective position determined according to the magnification designated, wherein the measuring means measures the magnification after the control means has made the image sensor move to a focusing position according to the output of the decision means while leaving the focusing lens means at its position, and then, the control means calculates each of the amounts of movements for the focusing lens means and for the image sensor respectively based on both of the magnification measured and the magnification designated, and finally, the focusing lens means and the image sensor are moved respectively by each of the amounts of movements calculated.

The optical principle employed in the present invention is as follows.

Assuming that the focusing length of the focusing lens means is equal to "f", the contraction ratio of the same is equal to "$\beta$" and the magnification for reading is equal to "M", the distance "a" defined between the lens means and the original and the distance "b" defined between the lens means and the focused image are respectively given according to the optical formulas as follows:

$$a = f[(1/\beta M) + 1]$$

$$b = f(\beta M + 1)$$

Once the present magnification was measured in the focused state, the distances "a" and "b" are calculated from the above equations respectively.

When a new desirable magnification "M'" is designated, distances $\Delta a$ and $\Delta b$ for the lens means and image sensor to be displaced respectively in order to provide said desirable magnification are calculated as follows;

$$\Delta a = f[(1/\beta M') + 1] - f[(1/\beta M) + 1]$$

$$\Delta b = f(\beta M' + 1) - f(\beta M + 1)$$

Accordingly, when the lens means and image sensor have been displaced by $\Delta a$ and $\Delta b$ respectively, the desired magnification is obtained in a focused state.

Therefore, the adjustments for the magnification and focusing are carried out smoothly in a short time.

According to one of the preferred embodiments, the measuring means according to the present invention is provided as a combination of a standard chart means and a calculating means which calculates a magnification according to outputs of the image sensor obtained when the image of said chart means is projected thereon through the lens means.

Said chart means may be a pattern having a black or white area of predetermined dimensions and/or a pattern of black and white stripes having a predetermined pitch.

According to another preferred embodiment of the present invention, the chart means includes both a pattern for measuring the reading magnification and a pattern for ajustment for the focusing.

Said former pattern is used for measuring the reading magnification and said latter pattern is used for deciding whether the device is focused or not.

In the case that these patterns are provided, both of the measurement of the magnification and the adjustment of the focusing can be carried out quickly by processing electrical outputs of the image sensor.

In order to guarantee a wide range within which any magnification can be designated, it is desirable to provide a few patterns of strips each of which has a stripe pitch different from each other corresponding to a value of a target magnification.

According to a further preferred embodiment, there are arranged patterns both at the center and peripheral portions of the angle of field. This arrangement can serve to maintain the best M.T.F over the entire range of the angle of field.

BRIEF DESCRIPTION OF THE DRAWINGS

The present invention will be more fully understood and further advantages will become apparent when reference is made to the following detailed description of the accompanying drawings, in which:

FIG. 3 is a block diagram showing the control circuit of the image reader according to the present invention, FIGS. 7 and 8 are flow charts showing the subroutines for the focus-adjustment and magnification-adjustment respectively.

DESCRIPTION OF THE PREFERRED EMBODIMENTS (a) Brief Construction of the Image Reader FIG. 1 is a schematical sectional view of an image reader.

As shown in FIG. 1, a halogen lamp 2 is provided for illuminating an original 4 laid on a document set plate 6. The original 4 is set along and parallel to a scale (not shown) provided along a side line of the set plate 6. As indicated by a hatched portion in FIG. 1, a chart means 7 is arranged along and parallel to a transversal edge line of the set plate 6 on the side from which the scanning is to be started. The format of the chart means 7 will be stated in the section (c).

Figure 1:
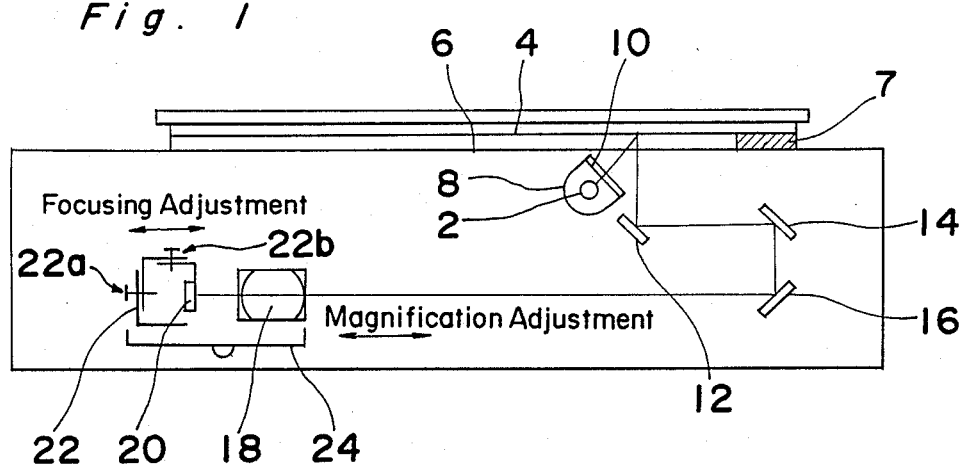
FIG. 1 is a schematical sectional view of an image reader according to the present invention.

The halogen lamp 2 provides a concave mirror 8 and a filter 10 for cutting ultra-red rays.

The light reflected by the original 4 is projected, through a focusing lens means 18, on a CCD image sensor 20 being comprised of a CCD linear array after having been reflected by a first, second and third mirrors 12, 14 and 16 in sequence.

Upon scanning the original 4, the halogen lamp 2 and mirrors 12, 14 and 16 are moved in the scanning direction by a driving mechanism (not shown) as is well known to those skilled in the art.

The CCD image sensor 20 is supported by a sensor holder 22 which provides a first and second adjusting means 22a and 22b for shifting the image sensor relative to the focusing lens means 18 in the direction of the optical axis thereof and for adjusting a mounting angle of the image sensor respectively. Said first adjusting means 22a can be controlled by a drive means (not shown) and a driver circuit therefor in order to position the image sensor 20 at an exact focusing position relative to the lens means. The CCD image sensor 20 and the focusing lens means 18 are supported on a carriage means 24 which is movable in the direction of the optical axis of the focusing lens means 18.

Figure 2:
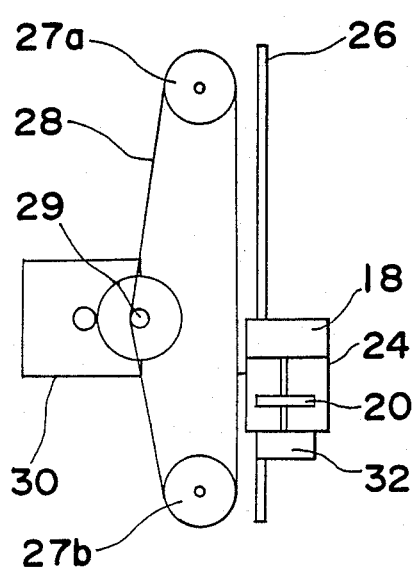
FIG. 2 is a plan view of the driving mechanism for adjustment of the magnification.

As shown in FIG. 2, said carriage means 24 is guided by a guide rail 26 extending parallel to the optical axis of the lens means 18 and is connected to a portion of an endless wire 28 running parallel to said guide rail 26. Said endless wire 28 is spanned between two pulleys 27a and 27b and is driven by a driving roller 29 which is driven, via a suitable gear train, by an electric motor 30.

Thus, the adjustment for magnification can be done by driving said motor 30 (hereinafter referred to as the lens motor).

Figure 13:
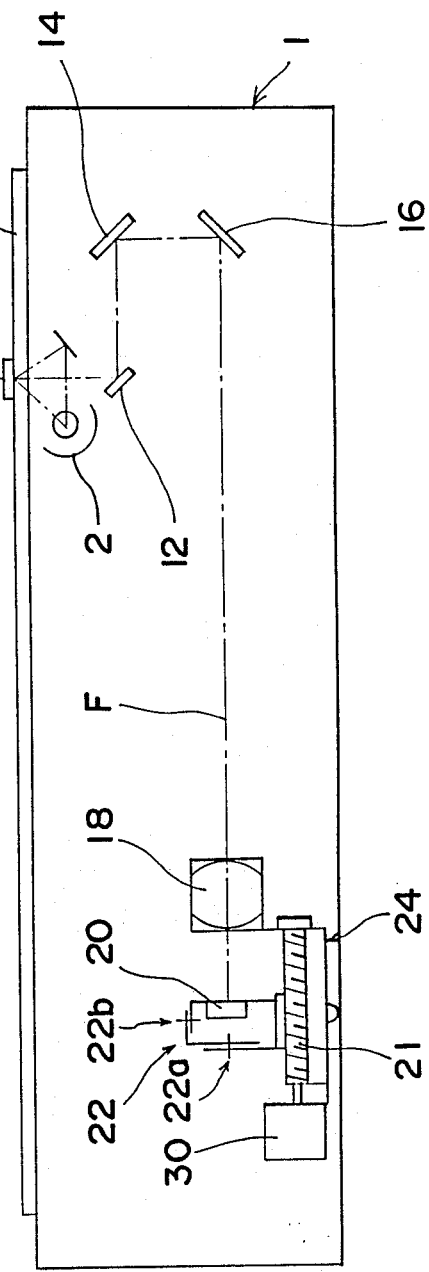
FIG. 13 is a schematical sectional view showing a variant of the image reader according to the present invention.

As shown in FIG. 13, the adjusting means for driving a carriage means 24 to adjust the magnification can consist of an electric motor (lens motor) 30 mounted on the bottom of the image reader and a screw shaft 21 driven to rotate around its own axis by the motor 30. When the screw shaft 21 is driven, the carriage 24 is moved in a direction parallel to the optical axis F of the lens means 18 supported thereby.

(b) Control Circuit of the Image Reader

FIG. 3 shows a block diagram of a control circuit provided in the image reader.

Clock signals generated by a clock generating circuit 40 are applied to the CCD image sensor 20 as sample-hold signals (hereinafter referred to as SH signals) and are fed to a central processing unit (CPU) 42. The image sensor 20 transforms optical signals into electric signals. An analogue-digital (A/D) converter 44 converts analogue electric signals having been output from the image sensor into digital signals.

A shading circuit 46 to which digital signals are inputted from the A/D converter 44 is provided for correction of possible unevenness in the intensity of the illuminating light in the main scanning direction and/or of possible fluctuation between or among elements of the image sensor 20. A shading signal output from CPU 42 is applied to the shading circuit 46 in order to give a timing for shading. Outputs from the shading circuit 46 are inputted into a comparator circuit 48 and a line RAM (random access memory) 50. Said comparator 48 outputs one bit signal to an output circuit 54 which is obtained as a result of comparison of the image signal corrected by the shading circuit 46 with a signal selected by a selector 52. The output circuit 54 outputs one-bit image signal and an effective image signal for indicating that said image signal is effective to an exterior device such as a printer. The line RAM 50 memorizes digital image signals of one scan-line which have been corrected by the shading circuit 46. The CPU 42 obtains data regarding to an image of one scan-line by reading said data memorized in the line RAM 50. Attributive data to be stored in a RAM 56 are attributes each representing the two valued attribute or dither attribute which is determined by the CPU according to the data memorized in the line RAM 50. The selector circuit 52 is switched according to each attribute upon transmitting data (scanning) to output each attribute data selected to the comparator 48.

A pattern generating circuit 58 is provided for generating threshold values when the dither is selected. Threshold values are given as a matrix of (m×n).

The selector 52 selects threshold data to be fed to the comparator 48 based on threshold data and attributive data given by the pattern generating circuit 58 and RAM 56. Namely, the selector 52 sends to the comparator 48 threshold data from the pattern generating circuit 58 when the dither attribute is designated or threshold data from the RAM 56 when the two-valued attribute is designated.

The CPU 42 controls all elements in the image reader to be controlled due to the signals above mentioned, motor signals, lamp signals, a variety of positioning signals and a variety of command signals. Upon adjusting the magnification and focusing, CPU 42 controls the lens motor 30 and a focusing motor 32 via drivers 60 and 62, respectively.

(c) Chart Pattern Means

Figure 4:
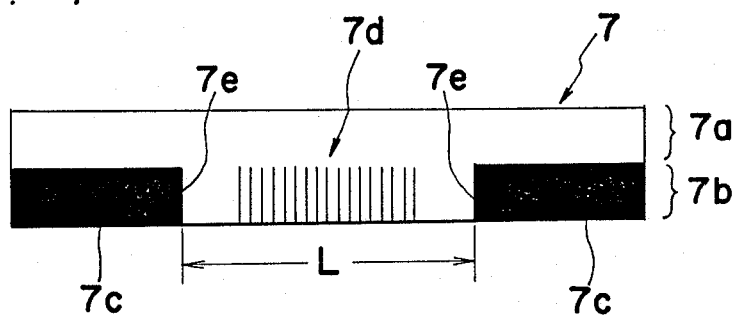
FIG. 4 is a plan view of a chart means according to the present invention.

As shown in FIG. 4, the chart means 7 is formed as a rectangular sheet member being elongated in the direction orthogonal to the scanning direction against the original. Said sheet member 7 has a first and second areas 7a and 7b being divided by the center line in the lengthwise direction thereof. The first area 7a is kept white for shading correction.

Upon shading correction, the image sensor 20 senses the light reflected by said shading area 7a and outputs are converted into digital data by the A/D converter 44. Then, the CPU 42 reads said digital data via the shading circuit 46 and the line RAM 50. Since the shading area 7a is made white uniformly, digital data having an identical level should be inputted. However, inputted data are varied due to a possible unevenness in the illuminating light of the lamp 2, fluctuation among outputs of elements of the image sensor 20 and so on. In order to prevent the influence due to those factors, the shading circuit 46 memorizes correction data obtained by reading said shading area 7a and corrects inputted data according to correction data upon processing real image data.

The second area 7b of the chart means 7 has two black patterns 7c being provided on both side end portions of the area 7b and a pattern 7d of black and white vertical stripes being provided at the center portion thereof.

The distance L defined between two black patterns 7c and 7c is detected and measured by the image sensor 20 and is compared with the predetermined standard distance to obtain the reading magnification. The rough adjustment for focusing is carried out by shifting the image sensor 20 according to data obtained about the distribution of density D at an inside edge portion 7e of the black pattern 7c.

Figure 5:
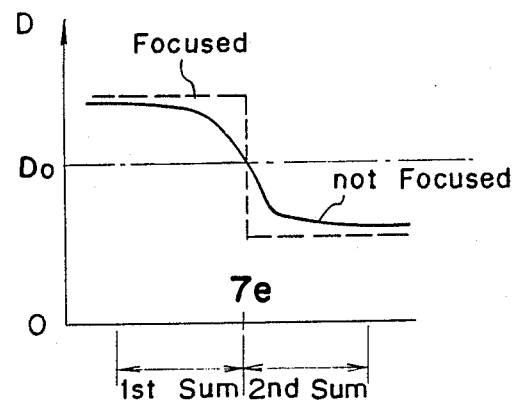
FIG. 5 is a graph showing the principle for deciding whether the image reader is focused or not, FIGS. 6(A) and (B) are flow charts showing the main routine program according to the present invention.

As indicated by a solid line in FIG. 5, the density distribution varies continously around the inside edge 7e when the image is not focused on the image sensor. On the contrary to the above, when the image is focused, the density distribution shows a discontinuous variation at the inside edge as indicated by a dotted line.

The focusing adjustment to be done prior to the use of the image reader is done as follows.

First, outputs of a series of elements of the predetermined number having levels higher than the predetermined level Do are summed up and, also, outputs of a series of elements of the identical number to the above predetermined number having levels lower than the level Do are summed up. Then, the difference between said first and second sums is calculated.

Next, a beat is measured in order to decide whether the image is focused or not which is generated due to the difference between the pitch of the stripe pattern 7d and that of the elements of the image sensor 20.

After the measurement, the focusing motor 32 is driven to shift the image sensor 20. Thereafter, the difference in the density is measured again and is compared with the last difference. When the present difference becomes larger than the last difference, the focusing motor 32 is driven again in the rotational direction same to that of the last time. When it becomes smaller, the focusing motor 32 is driven in the reversed rotational direction.

These operations are repeated until the maximum beat is obtained. When the maximum beat is obtained, the initial focusing adjustment is completed.

The focusing adjustment required when a new reading magnification is designated will be stated in the section (f).

(d) Flow Chart for Reading Image Data

Figure 6:
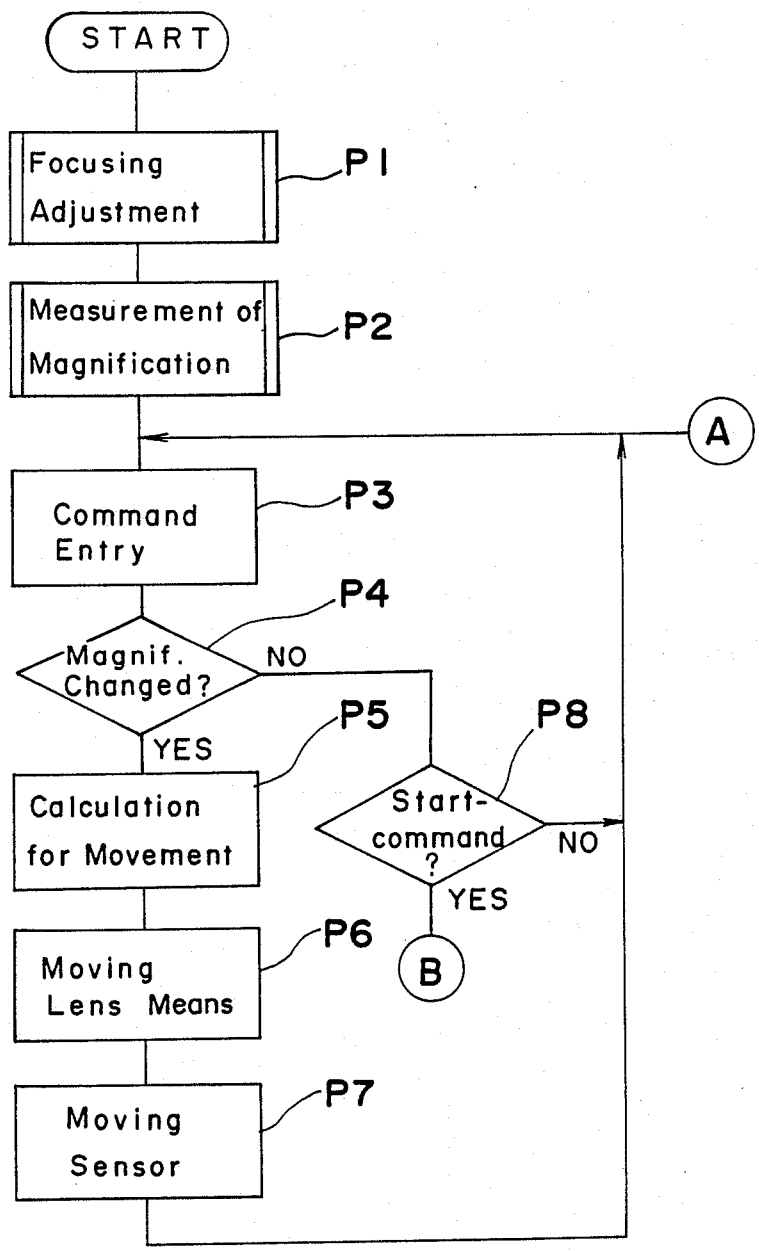

FIGS. 6(A) and (B) show a flow chart for reading image data according to the present invention.

When the power switch is turned on, the focusing adjustment is carried out at step P1. As mentioned above, the focusing adjustment will be stated in detail in the section (e). Then, the magnification of the present time is measured and the lens means is moved at step P2 (This process will be stated in detail in section (f)).

When the command signal is inputted at step P3, it is decided at step P4 whether a new magnification is designated or not. When it is designated, amounts of movements for the lens means 18 and the image sensor 20 are calculated respectively at step P5. The method for calculating these amounts will be stated in detail in section (f). Then, at step P6, the lens motor 30 is driven to move the lens means 18 by the amount calculated. At step P7, the focusing motor 32 is driven to shift the image sensor 20 by the amount calculated. Thereafter, the process is returned to step P3 to wait the next command.

When it was decided at step P4 that no new magnification was designated, it is decided at step P8 whether the command signal entered is the start-command or not. If the start-command was entered, the scanning operation is started.

Figure 6B:
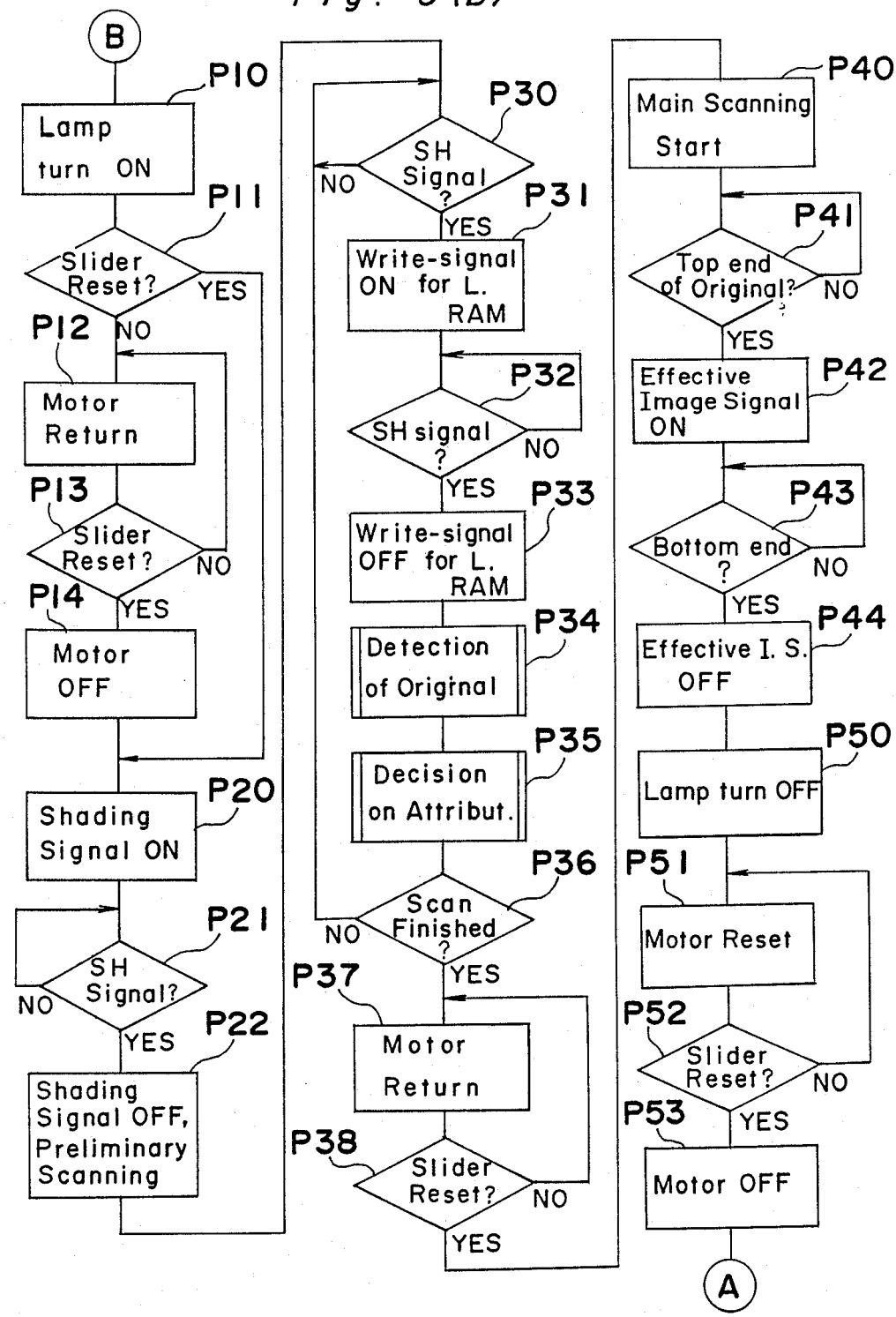

As shown in FIG. 6(B), the lamp 2 is turned on at first for exposure at step P14. Next, it is decided at step P11 whether the slider (not shown) of the scanning mechanism installed in the image reader has been returned to a predetermined initial position or not. If the slider has been returned, the process is proceeded to step P20. If not, the scanning motor for driving the slider is driven in the return direction to return the slider to said initial position at step P12 and, then, it is decided whether the slider has been returned to the initial position or not at step P13. When the slider has been returned thereto, the scanning motor is turned OFF at step P14.

Next, the procession for shading is carried out.

Since the slider is positioned at the initial position, the shading signal is applied to the shading circuit 46 from the CPU 42 at step P20 and, then, it is decided at step P21 whether a SH signal as a driving signal was applied to the image sensor 20 or not. When a SH signal was applied thereto, the shading signal is cut and a preliminary scanning for detecting the original to be read is started at step P22.

Next, it is decided at step P30 whether a SH signal is entered or not. When a SH signal is entered, outputs from the image sensor 20 having been corrected by the shading circuit are written into the line RAM 50 at step P31. It is decided at step P32 whether the next SH signal was entered or not. When the next SH signal was entered, the write signal to the line RAM 50 is cut at step P33.

Then, the starting and ending positions of the real image region of the original are found from data written in the line RAM 50 at step P34. Next, the real image region is divided into a plurality of blocks each of which is a block of $(10 \times 10)mm^2$ and the attribution of each block is decided based on data of the line RAM 50. The attribution decided is written into the selector 52 at step P35. Then, it is decided whether said preliminary scanning has been completed or not at step P36. If not, the process is returned to step P30. Next, the scanning motor is driven in the return direction to return the slider to the initial position at step P37. At step P38, it is decided whether the slider has been returned thereto or not. If not, the process is returned to step P37.

After these operations mentioned above, the main scanning is started. Namely, the scanning motor is driven in the scanning direction and the main scanning for reading an image is started thereby at step P40. At step P41, the process waits until the scanning proceeds to the top end of the original which is measured during the preliminary scan.

The printer of the image reader changes the timing for feeding out one copy paper or the timing of a synchronizing signal according to a dimension of a blank portion to be shared on the copy paper which is determined from the size of the original measured and the size of the copy paper.

When the scanning was proceeded to the position of the top end of the original, the effective image signal is applied to the output circuit 54 at step P42 to make output signals from the comparator 48 effective and the printer is activated for printing.

At step P43, it is decided whether the scanning was attained to the position of the bottom end of the original or not. And, when it was attained thereto, namely, the scanning has been completed, the effective image signal is cut to make outputs cancel.

After that, the lamp is turned OFF at step P50. Then, the scanning motor is driven in the return direction and it is decided at step P52 whether the scanning mechanism has been returned to the initial position thereof or not. If returned, the scanning motor is turned OFF at step P53. Then, the process is returned to step P1 for reading the next original.

(e) Focusing Adjustment

The focusing adjustment is carried out according to the flow chart shown in FIG. 7. Prior to the focusing adjustment, the slider is moved to the position of the chart means 7 in order to read the patterns thereof at step P60. Then the lamp 2 is turned on at step P61. Next, outputs of the image sensor 20 are written into the line RAM 50 at step P62.

Then, the direction of driving the focusing motor 32 is decided. As stated with respect to FIG. 5, the density distribution around the inner edge 7e of the black pattern 7c is considered. Namely, the first sum of outputs of a predetermined number of elements having levels higher than the predetermined density level Do and the second sum of outputs of the same number of elements having levels lower than the density lever Do are calculated respectively and, then, the difference between the first and second sums is calculated.

Thereafter, the focusing motor 32 is driven a little bit to obtain a next difference. The direction of driving the focusing motor is unchanged when the present difference becomes larger in comparison with the last difference and is reversed when the former becomes smaller than the latter (at step P63).

Then, it is decided whether the image is focused or not. In order for that, density data regarding to the stripe pattern 7d of the chart means 7 which are stored in the line RAM 50 are referred to calculate the beat at step P64. The beat is defined as a difference between the mean value obtained averaged among said density data and the minimum value among those. At step P65, it is decided whether the beat obtained is maximum or not. The beat tends to increase as the image sensor approaches to the exact focusing position and is decreased when it passes over the focusing position. Accordingly, when the beat of this time becomes smaller than the last beat, it means that the focusing position exists between the present and last positions. Therefore, the focusing adjustment is completed.

When it is decided that the beat is not maximum, the focusing motor 32 is driven, at step P66, in the direction determined at step P63 and, then, the process is returned to step P62 to continue the focusing adjustment.

(f) Magnification Adjustment

FIG. 8 shows a flow chart of the subroutine for processing the magnification adjustment. In the subroutine, the magnification of the optical system is measured after the focusing adjustment has been completed and, due to the measured value, the lens means 18 and image sensor 20 are shifted or moved respectively.

At first, the distance L defined between the both inner edges 7e and 7e of the black pattern 7c is measured based on density data memorized in the line RAM 50 at step P70. The present magnification M is given as the ratio of the length L measured at this time to the predetermined length Lo at step P71 ($M=L/Lo$).

Then, the image sensor 20 and lens means 18 are respectively so moved by driving the focusing motor 32 and lens motor 30 as to give the magnification M' designated at this time. The amount $\Delta b$ of movement of the image sensor 20 is calculated according to the equation;

$$\Delta b = f(\beta M'+1) - f(\beta M+1)$$

and the amount $\Delta a$ of movement of the lens means 18 is calculated according to the equation;

$$\Delta a = f[(1/\beta M')+1] - f[(1/\beta M)+1]$$

wherein f is a focus length of the lens means and $\beta$ is a contraction ratio According to these amounts $\Delta a$ and $\Delta b$, the lens motor 30 and the focusing motor 32 are driven respectively at step P73 and P74. Thus, the magnification designated is set by only one magnification adjustment operation. Thereafter, the lamp is turned OFF at step P75 to complete this subroutine.

FIGS. 9(a) and (b) show another embodiment of the present invention schematically.

As shown in FIG. 9(a), a contraction lens means 109 can be moved together with an image sensor 110 between a first position A for reading at the magnification of one time and a second position B for reading at the magnification of two times. A chart means 119 provided for the focusing adjustment and magnification adjustment has such a length that it may cover the angle $\theta_A$ of field defined at the first position A of the lens means 109. On the chart means 119, there are formed a first and second pairs of black and white vertical stripe patterns 118a and 118b.

The first and second stripe patterns 118a and 118b are provided corresponding to said first position A and second position B respectively and the pitch of stripes of the second stripe pattern 118b is set to one-half of that of stripes of the first stripe pattern 118a.

Figure 9C:
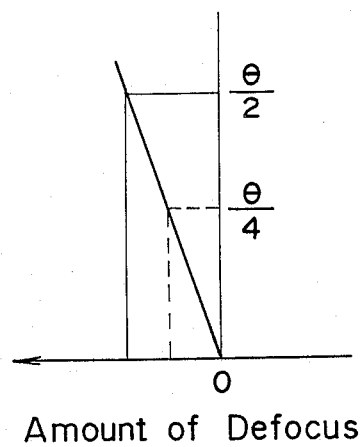
FIG. 9(a) is a schematical side view showing the second embodiment according to the present invention.
FIG. 9(b) is a plan view of another chart means employed in the second embodiment, FIGS. 9(c) and (d) are graphs respectively showing the focusing characteristics of the lens means with respect to the angle of field thereof.

Each of the first pair of stripe patterns is arranged at each middle portion between the center 0 of the angle of field and one edge $E_A$ thereof and each of the second pair of stripe pattern is arranged at each middle portion between the center 0 and the edge $E_B$ of the angle of field defined at the second position B of the lens means. The reason for the arrangements of these patterns is that the lens means employed has characteristics in which the amount of defocus varies with the angle of field linearly as is shown in FIG. 9(c).

Figure 9D:
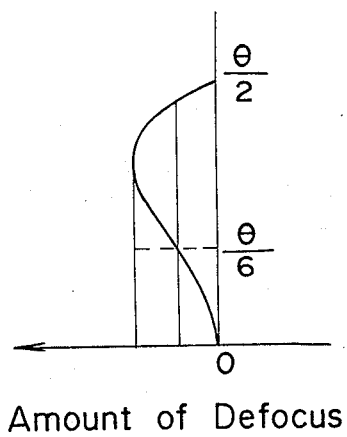

If the lens means has curved characteristics as shown in FIG. 9(d), it is desirable to arrange each strip pattern around the position corresponding to the angle of field of $(\theta/6)$ in order to obtain a substantially linear variation.

A black pattern 118c is further provided at the center 0 of the angle of field in order for a rough focusing adjustment and magnification adjustment. Since the position of the black pattern 118c does not affect the rough focusing adjustment, it is desirable to arrange said black pattern at the center position 0. Further, since the measurement of magnification is carried out after the focusing adjustment with the use of the stripe pattern, said central arrangement thereof is affirmative in this context.

Although each stripe pattern is provided as a pair in FIG. 9(b), it is enough to provide each one stripe pattern not as a pair.

Further, in the case that each stripe pattern is formed to have parallel stripes as in this embodiment, it becomes necessary to provide a plurality of stripe patterns when the range of magnification is widened further and, therefore, the width of each stripe pattern becomes restricted to a narrow one.

Figure 11:
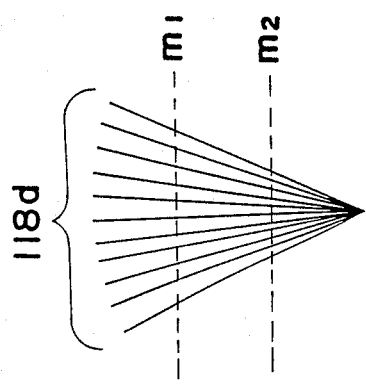
FIG. 11 is a schematical plan view of one more chart means.

In order to solve this problem, it is desirable to use a radial stripe pattern 118d as shown in FIG. 11, in which the pitch thereof is continuously varied in the scanning direction. In this case, the reading position to the stripe pattern 118d is changed according to the magnification to be set. In FIG. 11, the reading position for the even magnification and the reading position for a contraction magnification are indicated by lines $m_1$ and $m_2$ respectively.

Figure 10:
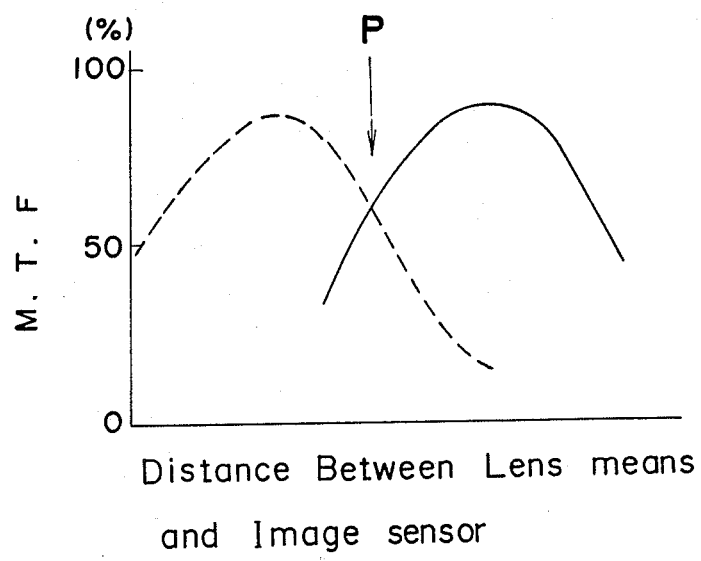
FIG. 10 is a graph showing the M.T.F characteristics obtained at the center of the angle of field and at the edge portion thereof.

FIG. 10 shows relations of the M.T.F (indicated by a solid line) evaluated at the center of the angle of field and the M.T.F (indicated by a dotted line) evaluated at the peripheral portion thereof obtained when the distance between the lens means and the image sensor is changed. As clearly understood from FIG. 10, if the image sensor 20 is positioned at a position corresponding to the peak of the M.T.F. evaluated at the center of the angle, the focusing thereat becomes best, but the focusing at the peripheral portion thereof becomes very bad. Contrary to the above, if the image sensor is positioned at a position corresponding to the peak of the M.T.F evaluated at the peripheral portion, the focusing at the center becomes very bad.

According to the present embodiment, the stripe patterns are so arranged as to be position at the middle portion between the center of the angle of field and the edge thereof respectively as is indicated by an arrow P in FIG. 10. Therefore, both focusing states at the center and edge portions are kept in good. Namely, over all area of the angle of field, good condition focusing is obtained.

In the preferred embodiments mentioned above, upon setting a new magnification, the adjustments for focusing and magnification are carried out as follows;

(a) shifting the image sensor by the focus adjusting means leaving the lens means at its position until it is decided by the focusing decision means that the image sensor is positioned at the focusing position, (b) measuring the present magnification in said focused state, (c) calculating amounts of movements about the lens means and image sensor based on the measured magnification and according to optical formulas in order to give a new magnification designated, (d) moving the lens means by the amount calculated by the magnification adjusting means and shifting the image sensor by the amount calculated by the focus adjusting means.

According to these steps, both of the focusing and magnification are adjusted in a short time.

However, there may be a possibility in this embodiment that the designated magnification is not set actually with some reasons to lead to wrong reading even when the lens means and image sensor are moved according to the process mentioned above. Accordingly, it is required to increase the reliability in the focus-magnification adjustment.

Figure 12:
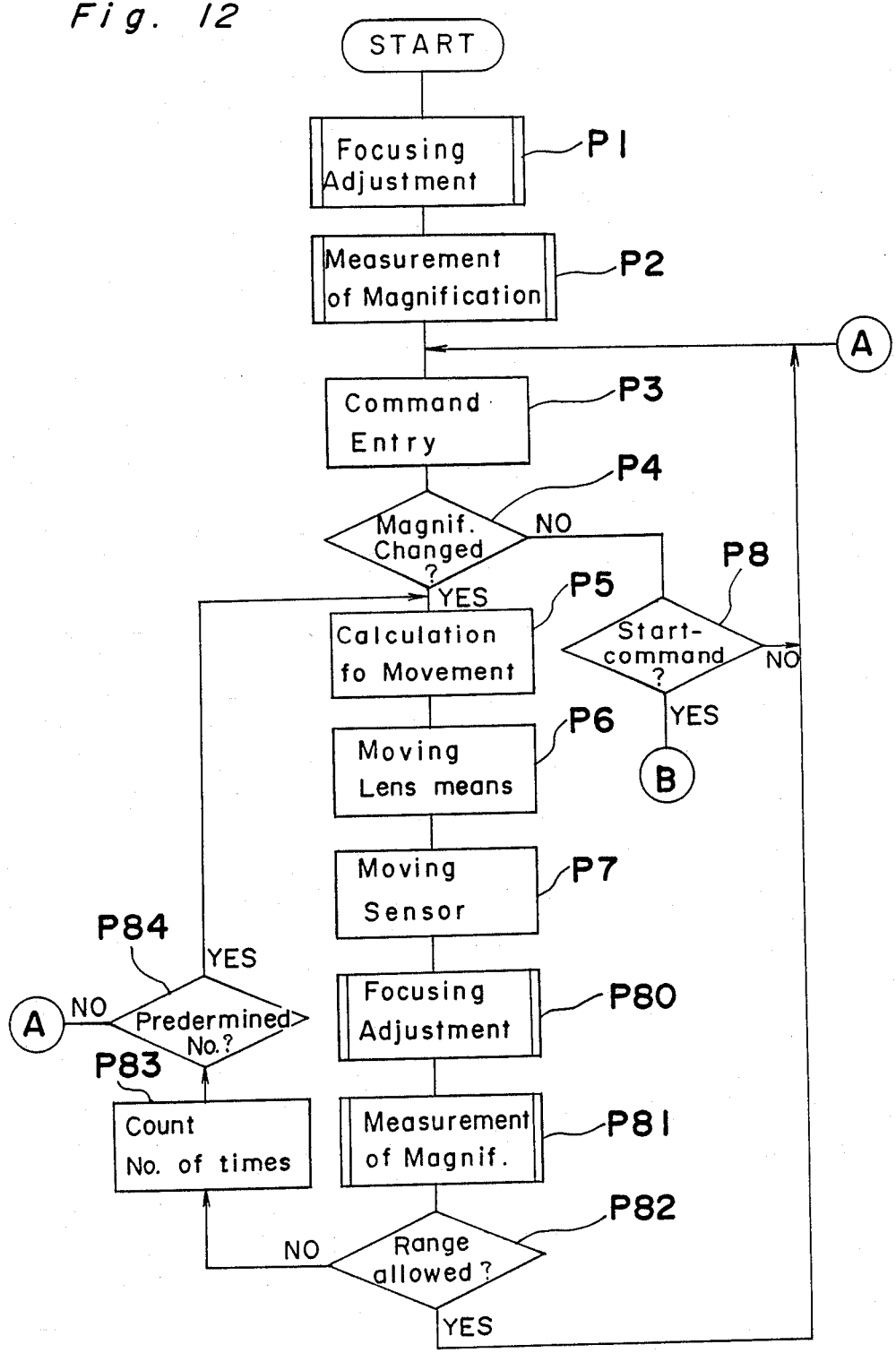
FIG. 12 is a flow chart of another routine program for the focus-magnification adjustment.

In order for that to be accomplished, another method is proposed hereafter. FIG. 12 shows a flow chart therefor. As is clear when compared with the flow chart shown in FIG. 7, five new steps P80 to P84 are added in the flow chart shown in FIG. 12.

After the sensor motor 32 has been driven, it is confirmed whether the magnification has been changed to the designated one or not. In order for that, the focusing adjustment is carried out again at step P80 according to the method similar to that of step P1. Then, the magnification is measured at step P81. The step P81 includes steps P70, P71 and P75 previously mentioned in regard to FIG. 8. Next, it is decided whether the magnification measured this time falls within the predetermined tolerable range about the magnification designated or not. If it falls therewithin, the process is returned to step P3 to wait the next command since this means that the magnification is set correctly.

If it does not fall therewithin, the number of times of the focus-magnification adjustments having been done until the present time is counted at step P83 and, then, it is decided whether said number of times is smaller or equal to the predetermined number of times or not at step P84.

If it was smaller than or equal to the predetermined number, the process is returned to step P5 to carry out the focus-magnification adjustment again in order to set the magnification correctly.

If the process failed to carry out the correct adjustment within the predetermined number of times, this fact is displayed on the display provided on the operation panel and the process is returned to step P3 to wait the next entry of the command.

According to this embodiment, a high reliability may be obtained since the focus-magnification adjustments are repeated until the correct result is obtained.

Although the present invention has been fully described by way of example with reference to the accompany drawings, it is to be noted here that various changes and modifications will be apparent to those skilled in the art. Therefore, unless otherwise such changes and modifications depart from the scope of the present invention, they should be construed as being included therein.

What is claimed is:

1. An image reader having a focusing lens means for focusing an original image on an image sensor wherein said focusing lens means and image sensor are movable relative to each other in the direction of the optical axis of the focusing lens means in order to read said image with a magnification designated which is characterized by comprising:

means for designating a magnification desired, means for moving the focusing lens means relative to the original, means for moving the image sensor relative to the focusing lens means, means for measuring a magnification corresponding to the position of the focusing lens means, a decision means for deciding whether the image is focused or not, and a control means for controlling said moving means for the focusing lens means and said moving means for the image sensor in order to move the focusing lens means and the image sensor to the respective positions determined according to the magnification designated, wherein the measuring means measures the magnification after the control means has made the image sensor move to a focusing position according to the output of the decision means while leaving the focusing lens means at its position, and then, the control means calculates each of the amounts of movements for the focusing lens means and for the image sensor respectively according to both the magnification measured and the magnification designated, and finally, the focusing lens means and the image sensor are moved respectively by the amounts of movements calculated.

2. An image reader according to claim 1, wherein said means for measuring magnification includes a standard chart means having a black or white area of a predetermined dimension and means for calculating a magnification according to outputs of the image sensor on which the image of said chart is projected through the focusing lens.

3. An image reader according to claim 1, wherein said decision means includes a standard chart having a pattern of black and white stripes defined so as to have a predetermined pitch and means for deciding a focused condition or not according to outputs of the image sensor on which the image of said chart is projected through the focusing lens.

4. An image reader according to claim 3, wherein at least two charts are provided and arranged at a middle position between the center portion of the angle of field and the peripheral portion thereof.

5. An image reader according to claim 3, wherein at least two standard charts are provided in each of said charts have a pitch of stripes different from each other, the charts being defined so as to cause an interference with the cells of the image sensor in a predetermined range of the magnification.

6. An image reader having a focusing lens means for focusing an original image on an image sensor wherein said focusing lens means and image sensor are movable relative to each other in the direction of the optical axis of the focusing lens means in order to read said image with a magnification designated which is characterized by comprising;

means for moving the focusing lens means relative to the original, means for moving the image sensor relative to the focusing lens means, a chart means having a pattern for measuring the reading magnification and a pattern for adjustment of the focusing, means for measuring the magnifications according to outputs of the image sensor when said pattern for measuring is projected thereon, means for deciding whether the image is focused or not according to outputs of the image sensor obtained when said pattern for adjustment of the focusing is projected thereon and sensed thereby, a first control means for controlling the means for moving the image sensor so as to move it to a focusing position thereof according to outputs of the means for deciding the focusing, a calculating means for calculating each of the amounts of movements for the focusing lens means and image sensor due to the magnification measured and the magnification designated when the image sensor has been positioned at the focusing position thereof, and a second control means for moving and positioning the focusing lens means and image sensor so as to provide the magnification designated.

7. An image reader according to claim 6, wherein said pattern for measuring magnification is a chart having a black or white area of a predetermined dimension and said measuring means includes means for calculating a magnification according to the outputs of the image sensor on which the image of said chart is projected through the focusing lens.

8. An image reader according to claim 6, wherein said pattern for adjustment of the focusing is a chart having a pattern of black and white stripes defined so as to have a predetermined pitch.

9. An image reader according to claim 8, wherein at least two charts are provided and are arranged at a middle position between the center portion of the angle of field and the peripheral portion thereof.

10. An image reader according to claim 8, wherein at least two standard charts are provided and each of said charts have a pitch of stripes different from each other and being defined so as to cause an interference with the cells of the image sensor in a predetermined range of the magnification.

11. An image reader having a focusing lens means for focusing an original image on an image sensor wherein said focusing lens means and image sensor are movable relative to each other in the direction of the optical axis of the focusing lens means in order to read said image with a magnification designated which is characterized by comprising;

a pattern means for adjusting the focusing which includes a pattern of stripes having a predetermined pitch, the pattern is arranged off-set from the center of the angle of field of the focusing lens means, a decision means for deciding whether a focused condition or not exists based upon outputs of the image sensor which are obtained when the image of said pattern means is sensed by the image sensor, and means for moving said image sensor according to outputs of the decision means.

12. An image reader according to claim 11, wherein said pattern means are arranged at a middle position between the center portion of the angle of field and the peripheral position thereof.

13. A method for adjusting each of the positions of an image sensor and a focusing lens which are provided in an image reader and which are capable of moving in the direction of an optical axis of the focusing lens, respectively, said method comprising the steps of;

(A) moving the image sensor into a focusing position while leaving the focusing lens at rest, (B) measuring a magnification of the focusing lens at the rest position, (C) calculating the amounts of movement of the image sensor and focusing lens based on the measured magnification and a designated magnification in order to give the designated magnification, and (D) moving the image sensor and the focusing lens by the calculated amounts, respectively.

14. A method as claimed in claim 13, further comprising the steps of;

(E) deciding whether a magnification resulting from the steps (A) to (D) falls within a predetermined tolerable range or not, and (F) causing the steps (A) to (D) to repeat when the decision of the step (E) is negative.

15. An image reader having a projection lens for projecting an original image on an image sensor wherein the projection lens and the image sensor are movable relative to each other in the direction of the optical axis of the projection lens in order to read the original image with a designated magnification, the image reader comprising:

means for designating a magnification to be used for image reading, means for moving the projection lens against the original, means for moving the image sensor against the projection lens;

a chart means having a first pattern for magnification measurement and a second pattern for focusing adjustment, the second pattern being arranged off-set from the center of the field angle of the projection lens;

a focusing means for controlling the image sensor moving means, while leaving the projection lens at its position, so as to move the image sensor to an in-focus position according to the output of the image sensor when the second pattern is projected thereon and sensed thereby;

means, in response to the completion of focusing by the focusing means, for measuring the magnification according to outputs of the image sensor at the in-focus position when the first pattern is projected thereon and sensed thereby;

a calculating means for calculating each of the amount of movement of the projection lens and the image sensor due to the measured magnification and the designated magnification; and a controlling means for moving and positioning the projection lens and the image sensor so as to provide the designated magnification.

16. An image sensor according to claim 15, wherein the chart means includes a boundary of black and white areas, the second pattern is a pattern of black and white stripes with a predetermined pitch, and the focusing means provides rough adjustment by use of the boundary of the black and white areas and fine adjustment by use of the stripe pattern.

17. An image reader according to claim 15, wherein the first pattern is a chart having a black and white area of a predetermined dimension and said measuring means includes means for calculating a magnification according to outputs of the image sensor on which the image of said chart is projected through the projection lens.

18. An image reader according to claim 6, wherein the second pattern is a chart having a pattern of black and white stripes defined so as to have a predetermined pitch.

19. An image reader according to claim 18, wherein at least two charts are provided and are arranged at a middle position between the center portion of the angle of field and the peripheral portion thereof.

20. An image reader according to claim 10, wherein at least two standard charts are provided and each of said charts have a pitch of stripes different from each other whereby they cause an interference with the cells of the image sensor in a predetermined range of the magnification.

21. An image reader according to claim 11, wherein the decision means calculates the difference between the average value of outputs from the image sensor sensing the stripe pattern and the minimum value among those, and the image sensor moving means makes the image sensor move so that the difference becomes maximum.

22. An image reader according to claim 11, wherein the pattern means includes at least two stripe patterns each of which has a pitch corresponding to equal magnification and enlarged magnification, respectively.

* * * * *